(12) United States Patent
Liu

(10) Patent No.: US 6,868,817 B2
(45) Date of Patent: Mar. 22, 2005

(54) SIMPLIFIED COMBUSTION CHAMBER

(75) Inventor: Zhengbai Liu, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 35 days.

(21) Appl. No.: 10/318,499

(22) Filed: Dec. 13, 2002

(65) Prior Publication Data
US 2004/0112323 A1 Jun. 17, 2004

(51) Int. Cl.[7] .................................................. F02F 3/00
(52) U.S. Cl. .................................................. 123/193.6
(58) Field of Search ................ 123/193.6, 270–285, 123/664; 29/888.04, 888.047; 92/172

(56) References Cited

U.S. PATENT DOCUMENTS

| | | | |
|---|---|---|---|
| 4,164,913 A | 8/1979 | Komiyama et al. | |
| 4,270,494 A | * 6/1981 | Garter et al. | 123/193.6 |
| 4,311,122 A | * 1/1982 | Banba et al. | 123/179 |
| 4,502,422 A | * 3/1985 | Brann | 123/193.6 |
| 4,532,686 A | * 8/1985 | Berchem | 123/193.6 |
| 4,535,683 A | 8/1985 | Dworak et al. | |
| 4,721,080 A | 1/1988 | Moriyasu et al. | |
| 4,883,032 A | 11/1989 | Hunter et al. | |
| 5,024,193 A | * 6/1991 | Graze, Jr. | 123/283 |
| 5,029,563 A | 7/1991 | Hu | |
| 5,285,755 A | 2/1994 | Regueiro | |
| 5,560,334 A | 10/1996 | Daxer et al. | |
| 5,653,204 A | 8/1997 | Shaffer | |
| 5,660,156 A | * 8/1997 | Whitacre et al. | 123/279 |
| 5,809,962 A | 9/1998 | Abbott et al. | |
| 5,868,112 A | 2/1999 | Mahakul et al. | |
| 5,954,038 A | 9/1999 | Warwick et al. | |
| 5,979,298 A | * 11/1999 | Whitacre et al. | 123/193.6 |
| 6,026,777 A | * 2/2000 | Kemnitz et al. | 123/193.6 |
| 6,112,715 A | 9/2000 | Nigro et al. | |
| 6,182,630 B1 | * 2/2001 | Zhu et al. | 123/193.6 |
| 6,286,414 B1 | * 9/2001 | Kruse | 123/193.6 |
| 6,532,913 B1 | * 3/2003 | Opris | 123/193.6 |

* cited by examiner

Primary Examiner—Marguerite McMahon
(74) Attorney, Agent, or Firm—Dennis Kelly Sullivan; Susan L. Lukasik; Jeffrey P. Calfa

(57) ABSTRACT

A combustion chamber assembly for use in a piston of a diesel engine includes a combustion chamber defined intersecting a crown of the piston, the combustion chamber being defined by three curved surfaces, adjacent surfaces having direct smooth junctures.

A piston and a method of forming a combustion chamber are further included.

46 Claims, 2 Drawing Sheets

SIMPLIFIED COMBUSTION CHAMBER

TECHNICAL FIELD

The present invention relates to a piston designed for use in a compression ignition (diesel) internal combustion engine. More particularly, the present invention relates to a combustion chamber defined in part in a piston and intersecting the crown of the piston.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation, minimizing the $NO_x$ entrained in the engine exhaust, and minimizing the amount of soot particulate also entrained in the engine exhaust. These last two considerations should be accomplished without hurting the fuel economy of the engine and without adversely affecting the power output of the engine.

It is known that changes in any one of a variety of engine design/operating variables, such as engine compression, combustion chamber shape, fuel injection spray pattern, and other variable can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the $NO_x$ emissions from the engine. Ever increasing regulatory demands mandate reduced levels of $NO_x$. Typically, a combustion chamber design that is effective at reducing $NO_x$ levels has been found to increase the levels of soot and vice-versa. Additionally, doing either of the aforementioned typically reduces engine torque and power outputs.

There are numerous examples of combustion chambers formed in the crown of a piston. Notwithstanding all these prior art designs, there remains a need for reduction both in $NO_x$ and entrained soot while at the same time maintaining or enhancing engine torque and power outputs without adversely affecting the fuel economy of the engine.

SUMMARY OF THE INVENTION

The piston of the present invention substantially meets the aforementioned needs of the industry. The combustion chamber of the present invention defined in the crown of the piston has been shown by substantiated simulation to greatly increase turbulence kinetic energy to the chamber and thereby to both reduce soot entrainment and $NO_x$ emissions. The piston has been shown to function effectively with cylinder heads having two or more valves. A further advantage of the piston of the present invention is that by being symmetrical with respect to a piston central axis, the combustion chamber is relatively more easily formed in the crown of the piston than known asymmetrical combustion chambers. The piston and combustion chamber of the present invention are preferably used in heavy-duty and medium-duty diesel engines.

The present invention is a combustion chamber assembly for use in a piston of a diesel engine includes a combustion chamber defined intersecting a crown of the piston, the combustion chamber being defined by three curved surfaces, adjacent surfaces having direct smooth junctures.

The present invention further is a combustion chamber assembly including a combustion chamber being defined intersecting a crown of the piston, the combustion chamber being defined by three curved surfaces, adjacent surfaces having direct smooth junctures, the combustion chamber having a center portion, the center portion being defined at least in part by a surface being a portion of a convex sphere to define a post, the sphere having a radius and an origin, the origin of the radius lying on a combustion chamber central axis. The combustion chamber further has an outwardly radially disposed sidewall margin, the sidewall margin being defined at least in part by an annular surface, the annular surface being concave and having an origin and a radius. The combustion chamber is further defined by an annular bowl lip surface joined to the sidewall margin.

The present invention is further a piston and a method of forming a combustion chamber.

DETAILED DESCRIPTION OF THE DRAWINGS

Figure 1:
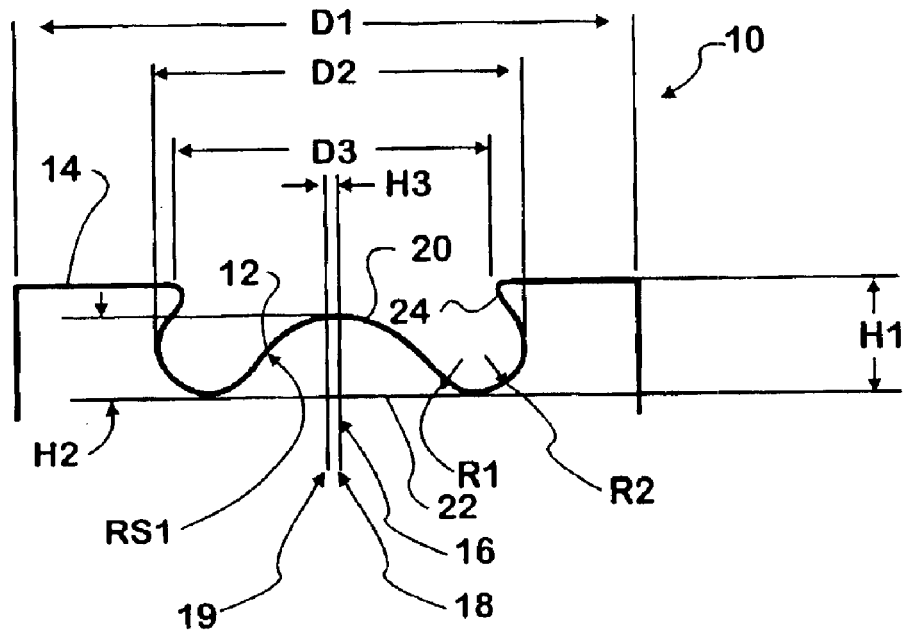
FIG. 1 is a sectional view of the piston and combustion chamber of the present invention.

The piston of the present invention is shown generally at 10 in FIG. 1. Generally, the piston 10 has a centrally located symmetrical upward-opening chamber bowl for forming a combustion chamber 12 in cooperation with cylinder structure within a cylinder of a diesel engine. The combustion chamber 12 is defined intersecting the crown 14 of the piston 10. The engine has a fuel injector (not shown) disposed generally above the piston 10 for forming an injected fuel plume relative to the combustion chamber 12. The piston 10 may be utilized with two-valve or multiple-valve heads. The piston 10 is effective for reducing diesel engine pollutant emissions, such as NOx and soot, as depicted in the graphic representations of FIGS. 3 and 4. The piston 10 is preferably applicable to heavy-duty and medium duty diesel engines. The design of the chamber 12 is simplified with respect to prior art chambers in that chamber 12 is formed of only three curved surfaces.

The piston 10 has a symmetrical upwardly opening cavity or bowl for forming a major part of the combustion chamber 12 within a cylinder of a diesel engine. The combustion chamber (bowl) 12 can generally be described as having a spherical bowl post RS1, annular bowl bottom R1, and an annular sidewall R2 as described in more detail below.

The combustion chamber 12 is located intersecting the piston crown 14 of diesel engines and comprises a portfolio of only three curved surfaces, as shown in FIG. 1. The three curved surfaces, RS1, R1, and R2, have smooth junctures requiring no additional surfaces to effect the junctures. The spherical surface RS1, with an origin 16 preferably lying on the center chamber axis 18 forms the central portion of the combustion chamber 12. The chamber axis 18 and the center axis 19 of the piston 10 may be co-axial. The spherical surface RS1 is located at the central bottom of the combustion chamber 12 to form a post 20 and has a radius of RS1 extending from an origin. The spherical surface RS1 is a convex sphere defining the center post 20 in the chamber 12.

The annular surface R1 forms the combustion bowl bottom, the lower part of the sidewall of the combustion chamber 12, and the minor reentrancy of the bowl of the combustion chamber 12. Annular surface R1 has a radius of R1 extending from an origin and is smoothly joined directly to the surface forming the post 20. The annular surface R1 is generally concave.

The combustion chamber 12 further has an annular surface R2 with a radius of R2 extending from an origin. The annular surface R2 provides a smooth transition between the bowl side and the piston crown 14. The annular surface R2 and the annular surface R1 are directly smoothly joined without any additional surface. Annular surface R2 functions as the upper part of the sidewall of the combustion chamber 12 and the main reentrancy of the combustion chamber 12 bowl.

It should be noted that the combustion chamber 12 as defined above is free of straight surfaces and that the three surfaces, RS1, R1, and R2, defining the combustion chamber 12 are smoothly joined to minimize flow loss occurring in the combustion chamber 12.

As indicated In FIG. 1, D1 is the diameter of the piston 10, D2 is the maximum diameter of the combustion chamber 12, D3 is the diameter of the bowl lip 24, H1 is the chamber bowl depth, H2 is the height of the bowl post 20 above a bottom plane 22 defined transverse to the axis 18 and tangent to the bottom of the annular surface R1, and H3 is the distance between the bowl axis 18 and the piston axis 19.

The origin of spherical surface RS1 is located on the central axis 18 of the combustion chamber bowl 12. The distance between the origin of spherical surfaces RS1 and the point of intersection of the combustion chamber axis 18 with the bottom plane 22 of the combustion chamber 12 should be equal to or greater than zero and should be less than 0.25 D1, and is preferably 0.053 D1. The central axis 18 of the combustion chamber bowl can coincide with the central axis 19 of the piston 10 or has an offset, that is, the distance H3 between the central axis 18 of the combustion chamber 12 and the central axis 19 of the piston should be equal to or greater than zero and should be less than 0.08 D1, and is preferably zero.

The relationship of parameters that further controls the combustion chamber geometry and the combustion performance and emissions in diesel engines are listed below:

1. The ratio of D2/D1 is greater than 0.44 and is less than 0.88, and is preferably 0.583, D1 being the piston 10 diameter and D2 being the maximum diameter of the combustion chamber.
2. The ratio of D3/D2 is greater than 0.33 and is less than 0.99 and is preferably 0.874, D3 being the diameter of the bowl lip.
3. The ratio of RS1/D2 is greater than 0.11 and is less than 0.44, and is preferably 0.298.
4. The ratio of H1/D2 is greater than 0.22 and is less than 0.55 and is preferably 0.316, H1 being the depth of the combustion chamber bowl.
5. The ratio of H2/D2 is greater than 0.11 and is less than 0.44, and is preferably 0.202, H2 being the height of the post 20.
6. The ratio of R1/D2 is greater than 0.05 and less than 0.33, and is preferably 0.134.
7. The ratio of R2/D2 is greater than 0.01 and less than 0.11 and is preferably 0.045.

The curved surfaces and smooth transitions (junctures between adjacent curved surfaces) of the combustion chamber 12 as previously described promote smooth flow in the combustion chamber 12 and act to reduce the thermal loading in the combustion chamber 12. Further, the combustion chamber 12 is preferably symmetrical about both the chamber axis 18 and the piston axis 19. Accordingly, it is much easier to turn (form) the combustion chamber 12 in the crown 14 of the piston 10 as compared to an asymmetrical combustion chamber defined in a piston.

Figure 2:
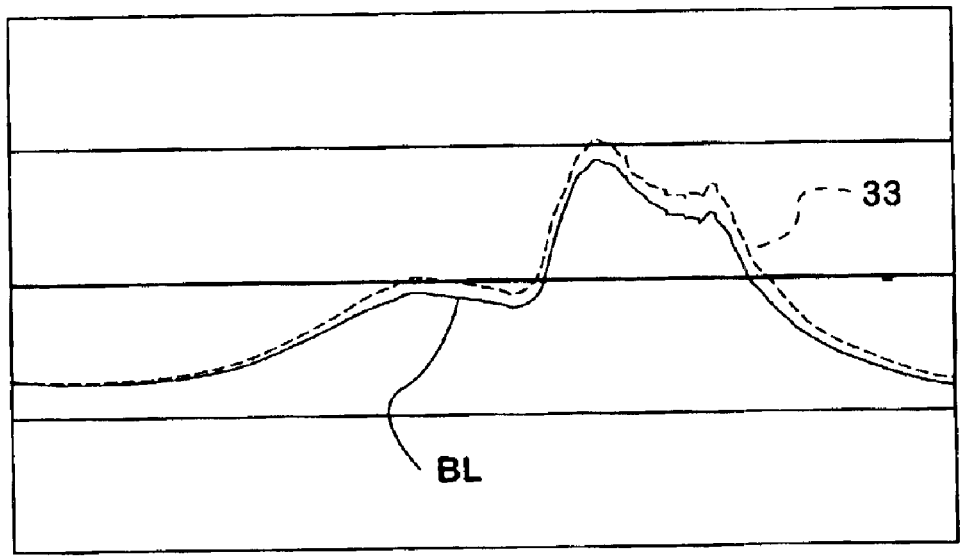
FIG. 2 is a graphic representation based on a simulation of power outputs comparing a baseline combustion chamber BL and the combustion chamber 33 of the present invention.

FIG. 2 presents a comparison based on simulation of turbulence kinetic energy between a baseline combustion chamber BL and a combustion chamber 33 made in accordance with the present invention. It is clear that the turbulence kinetic energy in the combustion chamber 33 is much higher than that in the baseline combustion chamber BL, which indicates that the combustion chamber 33 reduces the flow loss and promotes good air-fuel mixture, resulting in good combustion and low emissions. When the fuel consumption and the engine torque are kept almost identical, the emissions are reduced dramatically with combustion chamber 33 as compared to the baseline combustion chamber BL.

Figure 3:
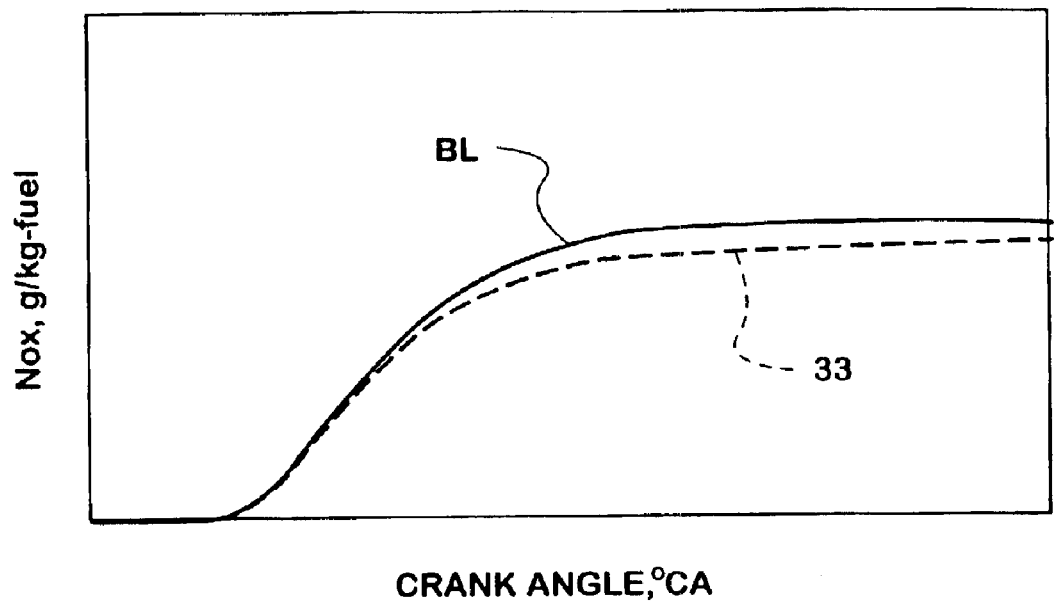
FIG. 3 is a graphic representation based on simulation of $NO_x$ generated with respect to crank angle comparing a baseline combustion chamber BL to the combustion chamber 33 of the present invention.

FIG. 3 displays a comparison based on simulation of $NO_x$ emissions between the baseline combustion chamber BL and combustion chamber 33. It is evident that the $NO_x$ emissions in the three-curve combustion chamber 33 of the present invention are reduced significantly, compared with the baseline combustion chamber BL.

Figure 4:
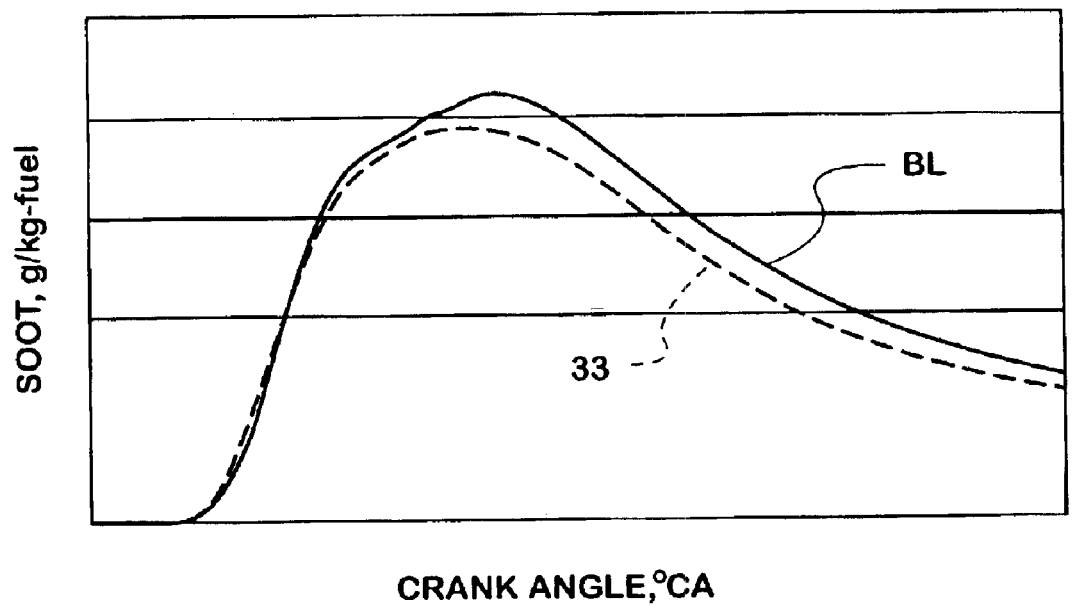
FIG. 4 is a graphic representation based on simulation of soot generated comparing the baseline combustion chamber BL of FIG. 3 compared to the combustion chamber 33 of the present invention.

FIG. 4 presents a comparison based on simulation of soot emissions between two types of combustion chambers. It is clear that the soot emissions in the three-curve combustion chamber 33 are much lower than those in the baseline combustion chamber BL.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a piston of a diesel engine, comprising:
    a combustion chamber being defined intersecting a crown of the piston, the combustion chamber being defined by three curved surfaces of revolution only, adjacent curved surfaces having direct smooth junctures requiring no additional surfaces to effect the junctures, a combustion chamber first curved surface being a center portion, the center portion being defined at least in part by a surface being a portion of a convex sphere to define a post, the post being an upward extending generally central bottom portion of the combustion chamber, the sphere having a radius and an origin;
    a combustion chamber second curved surface defining at least in part combustion chamber bottom and side margins and being defined at least in part by an annular surface, the annular surface being concave and having an origin and a radius and being joined to the post; and
    a combustion chamber third curved surface being defined by an origin and a radius and being smoothly joined to the second curved surface and intersecting the crown of the piston.

2. The combustion chamber assembly of claim 1 wherein the origin of the post is disposed on the center axis of the combustion chamber, the center axis of the combustion chamber being coaxial with the center axis of the piston.

3. The combustion chamber assembly of claim 2 wherein a juncture between adjacent surfaces requires no additional surfaces to effect a smooth transition.

4. The combustion chamber assembly of claim 2 wherein the combustion chamber is symmetrical about a combustion chamber axis.

5. The combustion chamber assembly of claim 1 wherein the ratio of a radius of a center portion convex spherical surface, RS1, of the combustion chamber to a maximum bowl diameter, D2, is greater than 0.11 and less than 0.44.

6. The combustion chamber assembly of claim 5 wherein the ratio of the radius of the center portion convex spherical surface, RS1, of the combustion chamber to the maximum bowl diameter, D2, is substantially 0.298.

7. The combustion chamber assembly of claim 1 wherein the ratio of a combustion chamber bowl diameter D2 to a piston diameter D1 is greater than 0.44 and less than 0.88.

8. The combustion chamber assembly of claim 8 wherein the ratio of the combustion chamber bowl diameter D2 to the piston diameter D1 is preferably substantially 0.583.

9. The combustion chamber assembly of claim 2 wherein the ratio of a diameter of the bowl lip D3 to a maximum bowl diameter D2 is greater than 0.33 and less than 0.99.

10. The combustion chamber assembly of claim 9 wherein the ratio of the diameter of the bowl lip D3 to the maximum bowl diameter D2 is substantially 0.874.

11. The combustion chamber assembly of claim 1 wherein the ratio of a annular surface R1 to a maximum diameter of the bowl D2 is between 0.05 and 0.33.

12. The combustion chamber assembly of claim 11 wherein the ratio of the annular surface R1 to the maximum diameter of the bowl D2 is substantially 0.134.

13. The combustion chamber assembly of claim 1 wherein the ratio of a annular surface R2 to a maximum diameter of the bowl D2 is between 0.01 and 0.11.

14. The combustion chamber assembly of claim 13 wherein the ratio of the annular surface R2 to the maximum diameter of the bowl D2 is substantially 0.045.

15. The combustion chamber assembly of claim 1 wherein the ratio of a bowl lip diameter H1 to a maximum bowl diameter D2 is between 0.22 and 0.55.

16. The combustion chamber assembly of claim 15 wherein the ratio of the bowl lip diameter H1 to the maximum bowl diameter D2 is preferably substantially 0.316.

17. The combustion chamber assembly of claim 1 wherein a ratio of the height of the bowl H2 to a maximum bowl diameter D2 is between 0.11 and 0.44.

18. The combustion chamber assembly of claim 17 wherein the ratio of the bowl post height H2 to the maximum bowl diameter D2 is preferably substantially 0.202.

19. The combustion chamber assembly of claim 1 the combustion chamber having a central axis, the combustion chamber central axis being coincident with a piston central axis.

20. The combustion chamber assembly of claim 1 being formed free of flat surfaces.

21. A piston of a diesel engine having a combustion chamber assembly, comprising:
a combustion chamber being defined intersecting a crown of the piston, the combustion chamber being defined by three curved surfaces of revolution only, adjacent curved surfaces having direct smooth junctions requiring no additional surfaces to effect the junctures, a combustion chamber first curved surface being a center portion, the center portion being defined at least in part by a surface being a portion of a convex sphere to define a post, the post being an upward extending generally central bottom portion of the combustion chamber, the sphere having a radius and an origin;
a combustion chamber second curved surface being defining at least in part a combustion chamber bottom and side margins and being defined at least in part by an annular surface, the annular surface being concave and having an origin and a radius and being joined to the post; and
a combustion chamber third curved surface having a radius and further being defined by an annular bowl lip surface joined to the second curved surface and intersecting the crown of the piston.

22. The piston of claim 21 wherein the origin of the post is disposed on the combustion chamber center axis, the center axis of the combustion chamber being coaxial with the center axis of the piston.

23. The piston of claim 21 wherein the juncture between adjacent surfaces requires no additional surfaces to effect a smooth transition.

24. The piston of claim 21 wherein the combustion chamber is symmetrical about a combustion chamber axis.

25. The piston of claim 21 wherein the ratio of a radius of the center portion convex spherical surface, RS1, of the combustion chamber to a maximum bowl diameter, D2, is greater than 0.11 and less than 0.44.

26. The piston of claim 25 wherein the ratio of the radius of the center portion convex spherical surface, RS1, of the combustion chamber to the maximum bowl diameter, D2, is substantially 0.298.

27. The piston of claim 21 wherein a ratio of the combustion chamber bowl diameter D2 to a piston diameter D1 is greater than 0.44 and less than 0.88.

28. The piston of claim 27 wherein the ratio of the combustion chamber bowl diameter D2 to the piston diameter D1 is preferably substantially 0.583.

29. The piston of claim 21 wherein a ratio of the diameter of the bowl lip D3 to a maximum bowl diameter D2 is greater than 0.33 and less than 0.99.

30. The piston of claim 29 wherein the ratio of the diameter of the bowl lip D3 to the piston diameter D1 is substantially 0.874.

31. The piston of claim 21 wherein the ratio of a annular surface R1 to a maximum diameter of the bowl D2 is between 0.05 and 0.33.

32. The piston of claim 31 wherein the ratio of the annular surface R1 to the maximum diameter of the bowl D2 is substantially 0.134.

33. The piston of claim 21 wherein a ratio of the annular surface R2 to a maximum diameter of the bowl D2 is between 0.01 and 0.11.

34. The piston of claim 33 wherein the ratio of the annular surface R2 to the maximum diameter of the bowl D2 is substantially 0.045.

35. The piston of claim 23 wherein a ratio of the bowl lip H1 to a maximum bowl diameter D2 is between 0.22 and 0.55.

36. The piston of claim 35 wherein the ratio of the bowl lip H1 to the maximum bowl diameter D2 is preferably substantially 0.316.

37. The piston of claim 21 wherein a ratio of the height of the bowl H2 to a maximum bowl diameter D2 is between 0.11 and 0.44.

38. The piston of claim 37 wherein the ratio of the bowl post height H2 to the maximum bowl diameter D2 is preferably substantially 0.202.

39. The piston of claim 21 the combustion chamber having a central axis, the combustion chamber central axis being coincident with a piston central axis.

40. The piston of claim 21 being formed free of flat surfaces.

41. A method of forming a combustion chamber for use in a piston of a diesel engine, comprising:

defining a combustion chamber bowl intersecting a crown of the piston, defining a piston central axis;

forming the combustion chamber by three curved surfaces of revolution only; smoothly forming junctures joining adjacent curved surfaces directly to one another without any additional surfaces to effect the junctures;

defining a combustion chamber elevated center post at least in part by a portion of a convex sphere, the sphere having a radius and an origin, defining a combustion chamber bottom and side in part by a first annular surface, the first annular surface having a radius and smoothly joining the annular surface to the post; and defining a smooth reentrant transition to the crown of the piston by a second annular surface having a radius, the second annular surface being smoothly joined to the first annular surface.

42. The method of claim 41 including defining smooth surface junctures between adjacent curved surfaces, without introducing any additional bowl surfaces.

43. The method of claim 41 including defining the combustion chamber by a spherical surface and two annular surfaces.

44. The method of claim 41 including disposing the origin of the center post on the piston central axis.

45. The method of claim 41 including forming the combustion chamber free of flat surfaces.

46. The method of claim 41 including disposing a combustion chamber central axis coincident with the piston central axis.

* * * * *